US 6,715,019 B1

(12) United States Patent
Benson et al.

(10) Patent No.: US 6,715,019 B1
(45) Date of Patent: *Mar. 30, 2004

(54) BUS RESET MANAGEMENT BY A PRIMARY CONTROLLER CARD OF MULTIPLE CONTROLLER CARDS

(75) Inventors: Anthony J Benson, Roseville, CA (US); James Lawrence White, Roseville, CA (US); Dovard K Howard, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 448 days.

This patent is subject to a terminal disclaimer.

(21) Appl. No.: 09/810,963

(22) Filed: Mar. 17, 2001

(51) Int. Cl.[7] .............................................. G06F 13/14
(52) U.S. Cl. ........................ 710/305; 710/302; 710/314; 710/14; 710/15; 710/301; 713/1; 711/114; 714/4
(58) Field of Search ................................. 710/305, 314, 710/302, 301, 14, 15; 713/1; 711/114; 714/4, 22, 23, 24, 14, 763

(56) References Cited

U.S. PATENT DOCUMENTS

| 5,696,895 | A | * | 12/1997 | Hemphill et al. | ............... 714/4 |
|---|---|---|---|---|---|
| 5,978,877 | A | * | 11/1999 | Strevey | ...................... 710/314 |
| 6,055,582 | A | * | 4/2000 | Pascarella et al. | ............ 710/14 |
| 6,061,752 | A | * | 5/2000 | Jones et al. | .................. 710/302 |
| 6,065,096 | A | * | 5/2000 | Day et al. | .................... 711/114 |
| 6,408,343 | B1 | * | 6/2002 | Erickson et al. | .............. 710/15 |
| 6,430,686 | B1 | * | 8/2002 | Cargemel et al. | .............. 713/1 |
| 6,567,879 | B1 | * | 5/2003 | Benson et al. | .............. 710/305 |

OTHER PUBLICATIONS

Warren Andrews, "As SCSI II fast approaches, some SCSI I problems remain unsolved", 1988, Computer Design, v27, n9, P45.*

* cited by examiner

Primary Examiner—Xuan M. Thai
Assistant Examiner—Justin King

(57) ABSTRACT

A communication system has multiple communication buses and multiple bus controller cards each supplying at least two independent channels of communication between one or more hosts and the communication buses. One of the controller cards is designated as a primary controller card for managing the communication buses and resetting the communication buses such that if a controller card is inserted to or removed from the system then the buses are reset.

20 Claims, 6 Drawing Sheets

BUS RESET MANAGEMENT BY A PRIMARY CONTROLLER CARD OF MULTIPLE CONTROLLER CARDS

CROSS-REFERENCES

The present invention is related to subject matter disclosed in the following co-pending patent applications, the contents of which are incorporated by reference herein in their entirety:

1. U.S. patent application Ser. No. 09/811,194 entitled, "Redundant, High-Availability Storage System", naming Anthony J. Benson and James J. deBlanc as inventors and filed on even date herewith.
2. U.S. patent application Ser. No. 09/810,963 entitled, "Data Corruption Avoidance on a Backplane Bus Adapted to Receive Bus Controller Cards of Different Tynes", naming Anthony J. Benson and Patrick McGoey as inventors and filed on even date herewith.
3. U.S. patent application Ser. No. 09/811,193 entitled, "Multiple-Path Interface Card for Interfacing Multiple Isolated Interfaces to a Storage System", naming Anthony J. Benson and James J. deBlanc as inventors and filed on even date herewith.
4. U.S. patent application Ser. No. 09/810,965 entitled, "DIP Switch Configuration for Increased Usability with Multiple Cards", naming Anthony J. Benson, Chadi Theodossy, and Joanna Baisden as inventors and filed on even date herewith
5. U.S. patent application Ser. No. 09/811,192 entitled, "Circuit for Switching One or More HVD Transceivers", naming Anthony J. Benson as inventor and filed on oven date herewith.
6. U.S. patent application Ser. No. 09/811,196 entitled, "Communication Bus Controller Including Designation of Primary and Secondary Status According to Slot Position", naming Anthony J. Benson, James L. White, and Dovard K. Howard as inventors and filed on even date herewith.
7. U.S. Pat. No. 6,567,879 entitled, "Management of Resets For interdependent Dual Small Computer Standard Interface (SCSI) Bus Controllers", Anthony J. Benson, et al.

BACKGROUND

This invention generally relates to the field of computing and data communications and, more particularly, to management of communication bus resets used to control data communications between a computing system and one or more peripheral devices.

A computing system (e.g., a host) may be connected to one or more peripheral devices (e.g., data storage devices, printers, and scanners). In a computing environment, an interface mechanism connects a computing system with the peripheral devices. The interface mechanism typically includes a data communication bus to which the devices and the computing system attach. The communication bus allows the computing system and the peripheral devices to communicate in an orderly manner. One or more communication buses may be utilized in a system.

Typically, a control logic device, known as a bus controller, monitors and manages data transmission between the computing system and the peripheral devices by prioritizing the order and the manner in which said devices take over and access the communication buses. In various interface mechanisms, control rules, also known as communication protocols, are implemented to promote the communication of information between computing systems and peripheral devices. For example, Small Computer System Interface or SCSI (pronounced "scuzzy") is an interface mechanism that allows for the connection of multiple (e.g., up to 15) peripheral devices to a computing system. SCSI is widely used in computing systems, such as desktop and mainframe computers.

The advantage of SCSI in a desktop computer is that peripheral devices, such as scanners, CDs, DVDs, and Zip drives, as well as hard drives can be added to one SCSI cable chain. The distinct advantage of SCSI is its use in network servers where several hard drives can be easily configured as fault-tolerant clusters. That is, in the event one drive fails, it can be removed from the SCSI bus, and a new one inserted without loss of data even while the system is still operational. A fault-tolerant communication system is generally designed to detect faults, such as power interruption or removal or insertion of peripherals, so that it can reset the appropriate system components to retransmit any lost data.

SCSI peripherals can be also daisy chained together. In a daisy chain environment an intermediate device has two ports. The first port connects to a computing system or another intermediate device attached to a computing system. The first port allows the device to communicate with the computing system. The second port is either terminated (i.e., not attached to anything) or attached to another device and allows for the computing system and the other device to communicate through the intermediate device. Thus, one or more devices can be attached in a line using a SCSI communication bus.

A SCSI communication bus uses the SCSI protocol for data communications. Hardware implementation of a SCSI communication bus is generally done using a 50 conductor flat ribbon or round bundle cable of characteristic impedance of 100 Ohm. The nominal distance is six meters in single ended mode and 25 meters in differential mode. Currently, a SCSI communication bus includes a bus controller included on a single expansion board that plugs into the host computing system. The expansion board is typically known as a "SCSI host adapter."

In some embodiments, single SCSI host adapters are also available with two controllers that can support up to 30 peripherals. The SCSI host adapters can connect to an enclosure housing multiple devices. In the mid-range to high-end markets, the enclosure may have "interface cards" or "controller cards" providing paths from the host adapter to SCSI busses resident in the enclosure. These controller cards can also provide bus isolation, configuration, addressing, bus reset and fault detection functionalities for the enclosure. The controller card provides a connection path from the host adapter to the SCSI buses resident in the enclosure. The controller cards usually provide configuration, addressing, bus reset, and fault detection functionality for the enclosure.

One or more controller cards may be plugged in or unplugged from the backplane while data communication is in process. The insertion and removal of peripheral devices or controller cards to the backplane while the computing system is operating is referred to as "hot plugging." For more information on the SCSI protocol and implementations, please refer to the "American National Standard for SCSI-2," available as Document X3.181-199X from Global Engineering Documents, 2805 McGaw, Irvine, Calif. 92174, hereby incorporated by reference herein in its entirety.

Certain events may cause changes in the electrical load on the communication bus while the computing system and peripheral devices are communicating. For example, interruption of power, attachment or removal of a peripheral device to a communication port, or insertion or removal of one or more controller cards into the backplane, can cause electrical changes in the data and control signals transmitted in the system. These changes can adversely influence the integrity of data communicated over the system buses. To avoid data corruption or data loss, it is needed to reset the buses upon occurrence of one or more of said events. Further, where the system includes a plurality of bus controllers, a method is needed to coordinate the resets and to determine which bus controller should oversee the resets.

SUMMARY

Systems and corresponding methods for generating reset signals depending on the status of a controller card in a communication interface are provided. In one aspect of the invention, a communication interface is implemented between a computing system and one or more peripherals. The communication interface includes an interconnection backplane with at least two interface slots for one or more communication buses implemented on the backplane. Each slot receives one or more controller cards and connects the controller cards to one or more communication buses. Each communication bus includes communication ports for attachment to one or more peripheral devices. The controller cards manage the operation of the communication buses.

The controller cards include one or more controllers including logic circuitry for determining the status of the controller card and generating bus reset signals under certain conditions, such as power interruption or change in system configuration. A controller card may be designated to have a primary status (i.e., master) or a non-primary status (i.e., slave). The card with the primary status is responsible for controlling the communication buses by driving and initiating bus addresses if any of the following events occurs: the system's power is interrupted, a device is inserted or removed from the buses, or a controller card is removed or added to the system. The non-primary card also resets the buses in case of a power interruption and takes over the control of the communication buses when the primary controller card is removed from the system or disabled.

In one embodiment, the system includes a first backplane connector for connecting a controller card to a first communication bus and a second backplane connector for connecting the controller card to a second communication bus. A logic chip, such as an isolator or bridge circuit, is included in one or more of said bus controllers and is capable of electrically isolating or connecting the first connector to the second connector. When the logic chip is enabled it connects the first connector to the second connector, this bridges the first bus and the second bus. However, when it is disabled, the first and second connectors are isolated.

In accordance with one or more aspects of the invention, in a communication system having one or more power supplies, a first bus managed by a first controller card, and a second bus managed by a second controller card, said first and second buses being capable of being bridged by logic circuitry, wherein the logic circuitry generates reset signals to reset first and second buses such that: if a controller card is inserted to or removed from an interface slot then the first and the second bus are reset; if a peripheral device is inserted to or removed from the first bus then if the first controller card has primary status then if the first and second buses are bridged then the first and the second buses are reset; if the first and second buses are isolated then the first bus is reset; if a peripheral device is inserted to or removed from the second bus then if the second controller card has primary status then if the first and second buses are bridged then the first and the second buses are reset; if the first and second buses are isolated then the second bus is reset; and if all power supplies fail then first and second buses are reset.

The invention will be more fully understood upon consideration of the detailed description below, taken together with the accompanying figures.

DETAILED DESCRIPTION

Figure 1:
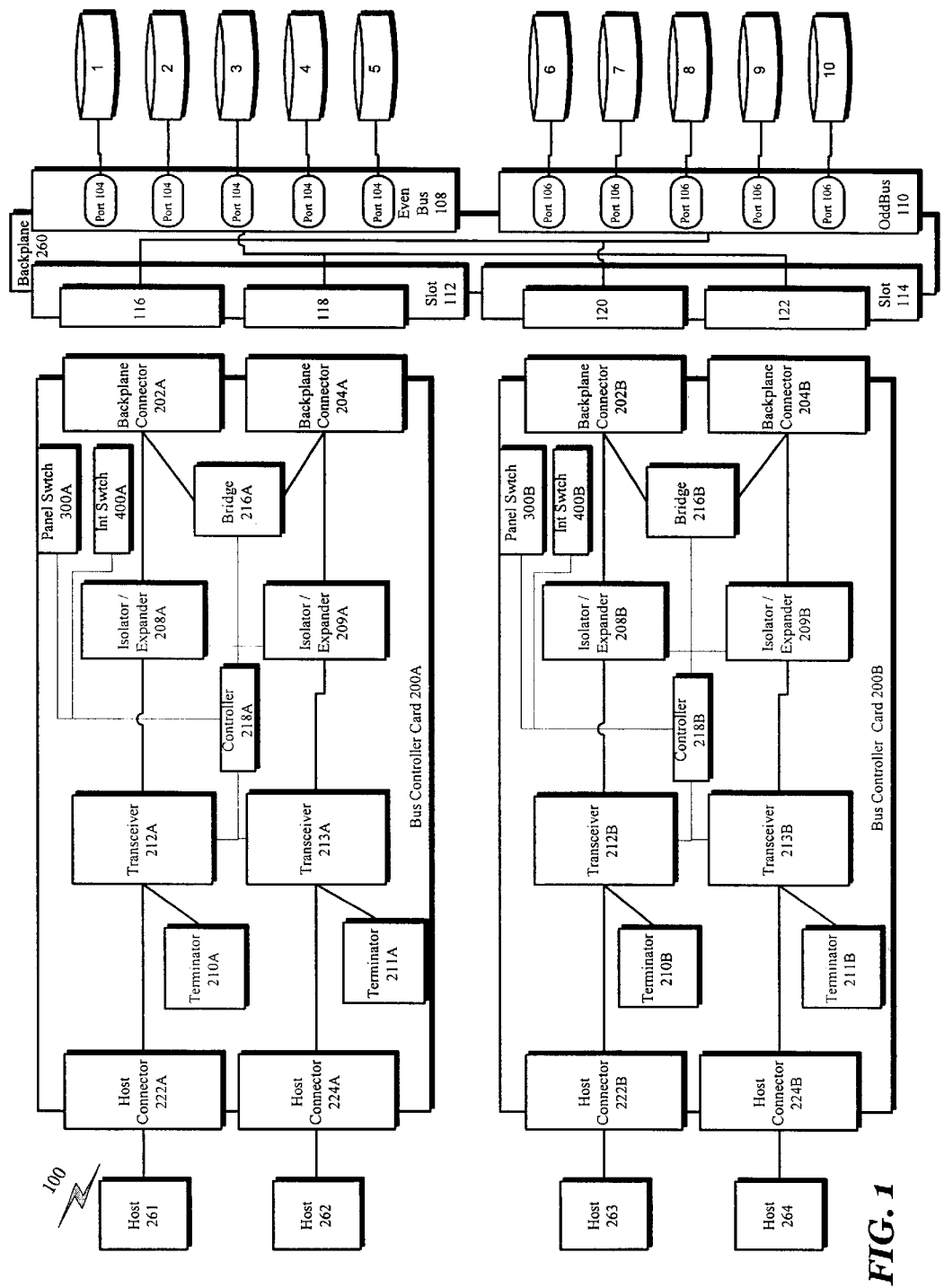
FIG. 1 is a block diagram of a communication environment and the associated interface mechanism with two controller cards connected to a backplane having even and odd communication buses, each bus having two interface slots for interfacing with two controller cards, in accordance with one or more embodiments of the invention.

FIG. 1 illustrates a block diagram of a communication system 100, including bus controller cards 200A and 200B in relation with peripheral devices 1 through 10 and the corresponding data interface mechanisms. The data interface mechanisms include a backplane 260 upon which other communication components are implemented. Backplane 260 is, typically, a printed circuit board that may be utilized as a component within other assemblies, such as peripheral devices 1 through 10. In certain embodiments of the system, backplane 260 includes at least two interface slots 112 and 114, for example, that allow controller cards 200A, and 200B to electrically connect to backplane 260.

Even and odd buses 108 and 110 are implemented on top of backplane 260 to promote data communication between peripheral devices 1 through 10 and computing systems (e.g., hosts 261, 262, 263, and 264) attached to backplane 260 via bus controller cards 200A and 200B. Bus controller cards 200A and 200B, as well as even and odd buses 108 and 110, can communicate using the SCSI communication protocol, for example. As such, system 100, in accordance with one or more embodiments of the invention, may be described and operate in conformity with SCSI standards. However, the system may include other types of communication interfaces and operate in accordance with other communication protocols, if desired.

Even bus 108, advantageously, includes a number of ports 104. Odd bus 110, similarly includes plurality of ports 106.

Ports 104 and 106 can each have the same physical configuration. The ports 104, 106 are adapted to connect to a peripheral device, such as a disk drive, for example. Ports 104 and 106 may be divided among even and odd buses 108 and 110 and other arrangements if desired, and are not limited to the exemplary embodiment illustrated in FIG. 1.

A first interface slot 112 (also referred to as bus controller slot 112) and a second interface slot 114 (also referred to as bus controller slot 114) are included on backplane 260. The first bus controller slot 112 includes a first connector 116 electrically connected to odd bus 110 and a second connector 118 electrically connected to even bus 108. The second bus controller slot 114 includes a first connector 120 electrically connected to odd bus 110 and a second connector 122 electrically connected to even bus 108. Connectors 116, 118 in the first bus controller slot 112 are physically and electrically configured to receive a first bus controller card. The connectors 120, 122 in the second bus controller slot 114 are also physically and electrically configured to receive a second bus controller card.

In some embodiments, even bus 108 and odd bus 110 are connected through one or more bus controller cards inserted into the first bus controller slot 112 and/or the second bus controller slot 114. That is, even bus 108 is separated physically and electrically from odd bus 110, such that the connection or connections between the even and odd busses 108 and 110 are made via one or more bus controller cards.

Bus Controller Card Hardware Implementation

Referring as well to FIG. 1, schematics of bus controller cards 200A and 200B are shown. In one or more embodiments, bus controller cards 200A and 200B are physically and electrically adapted to be received by either the first bus controller slot 112 or the second bus controller slot 114 Bus controller cards 200A and 200B each include a pair of backplane connectors, respectively backplane connectors 202A, 204A, and backplane connectors 202B, 204B, as shown. Each bus controller card 200A or 200B is physically and electrically adapted to interface with connectors 116 and 118 in the first bus controller slot 112, or the connectors 120 and 122 in the second bus controller slot 114, for example. Backplane connectors 202A and 204A or 202B and 204B may be any type of connector useful for electrically linking cards 202A and 202B to backplane 260. In one embodiment, the backplane connectors are 240 pin count connectors available from Berg-Metral, part number 73981-102.

Host connectors 222A and 224A are electrically connected to bus controller card 200A. Similarly, host connectors 222B and 224B are electrically connected to bus controller card 200B. Host connectors 222A, 224A, 222B, and 224B are adapted, respectively, for connection to host computers 261, 262, 263, and 264, for example. In embodiments of the system, bus controller cards 200A and 200B provide an independent channel of communication between each host and communication buses implemented on backplane 260. Cards 200A and 200B may include one or more electrical components, depending on implementation. Host connectors 222A, 224A, 222B, and 224B receive voltage-differential input or transmit voltage-differential output. Even and odd buses 108 and 110 can be SCSI buses or similar single-ended buses, for example.

Controller cards 200A and 200B respectively include a transceivers 212A and 212B. Transceivers 212A and 212B are associated with backplane connectors 202A and 202B, respectively. Transceivers 212A and 212B convert the voltage levels of differential signals to the voltage level of signals utilized on a single-ended bus. In one embodiment, transceivers 212A and 212B are 9-Channel Differential Transceivers from Texas Instruments, part number SN75976A. Cards 200A and 200B may include terminators 210A and 210B, respectively, associated with backplane connectors 202A and 202B respectively. The terminators are required at an end of a SCSI or other single-ended bus to signal the terminal end of the bus. In one embodiment, the terminators are DS2108 terminators from Dallas Semiconductor.

Further, cards 200A and 200B may also include isolators/expanders 208A and 208B, respectively, used to electrically isolate and retime signals on a single-ended bus, such as SCSI signals. Isolators/expanders 208A and 208B can isolate even and odd buses 108 and 110 from the circuitry on one or both cards 200A and 200B. Isolator/expander 208A is located between, and electrically connected to both, backplane connector 202A and transceiver 212A. In one embodiment, isolator/expander 208A is an integrated circuit from LSI Logic, part number SYM53C140. Isolator/expander 208B is similarly connected in card 200B, in accordance with one or more embodiments.

Backplane connectors 204A and 204B are electrically connected to host connectors 224A and 224B, respectively. Host connectors 224A and 224B are adapted for connection to host computers 262 and 264, for example. Cards 200A and 200B may also include transceivers 213A and 213B and isolator/expanders 209A and 209B, respectively. As shown, isolator/expanders 209A is located between and electrically connected to backplane connector 204A and transceiver 213A. Likewise, isolator/expanders 209B is located between and electrically connected to backplane connector 204B and transceiver 213B. Thus, as shown, each host can connect to one of the buses 108 or 110 through an independent communication channel implemented in bus controller cards 200A or 200B, wherein the independent communication channel includes at least one or more of the following components: a host connector, a transceiver, an isolator/expander, and a backplane connector.

Second terminators 211A and 211B, may be respectively included in cards 200A and 200B, in association with backplane connectors 204A and 204B, respectively. Furthermore, each card 200A and 200B may include a bridge 216A or 216B, as shown. Bridges 216A and 216B provide a controllable connection between the even bus 108 and the odd bus 110. In one embodiment, bridges 216A and 216B may be respectively included in the same integrated circuit as isolator/expanders 208A, 208B and 209A, 209B. Bridge 216A connects isolator/expanders 208A and 209A. Similarly, bridge 216B connects isolator/expanders 208B and 209B. In certain embodiments however, bridges 216A and 216B may connect even bus 108 to odd bus 110 at a different location on cards 200A and 200B. In some embodiments, card 200B may not include bridge 216B if card 200A includes bridge 216A. The opposite configuration may also be true, if desired. That is, card 200A may not include bridge 216A. As such, system 100 can be implemented with one bridge for connecting even bus 108 and odd bus 110.

When one of the bridges 216A or 216B is activated, cards 200A and 200B are said to be bridged (i.e., bridged mode). When neither of the bridges 216A or 216B are activated, cards 200A and 200B are said to be split (i.e., split mode). In bridged mode, a host attached to one of the cards can communicate with peripheral devices attached to both cards. For example, if cards 200A and 200B are bridged with host 261 connected to card 200A, then host 261 can communicate with peripheral devices 1 through 10. However, if cards 200A and 200B are split, then host 261 can communicate with peripheral devices 1 through 5.

A controller 218A may also be included on card 200A. Controller 218A is electrically connected to the other components on card 200A, such as backplane connectors 202A, 204A, host connectors 206A, 214A, transceivers 212A, 213A, terminators 210A, 211A, isolator/expanders 208A, 209A and bridge 216A. The connection between controller 218A and the other components on card 200A is advantageously made by connecting to the circuitry on card 200A that is in place to interlink those components, but may be made directly to each component, if desired.

Controller 218A receives signals from and transmits command signals to those components on card 200A. Accordingly, a controller 218B may be included on card 200B with similar electronic connectivity and functionality as that described for controller 218A. In one embodiment, controllers 218A and 218B are Programmable Logic Device (PLD) integrated circuits from Altera, part number EPF6016A0C208-2, for example.

The logic chips and circuitry described here may also be implemented using Field Programmable Gate Arrays (FPGAs) or Application Specific Integrated Circuit (ASICs). A FPGA is a PLD with a high density of gates. An ASIC is a chip that is custom designed for a specific application rather than a general-purpose chip. The use of FPGAs and ASICs improves the performance of the system over general-purpose CPUs, because these logic chips are hardwired to perform a specific task and do not incur the overhead of fetching and interpreting stored instructions.

Panel switches 300A, 300B and internal switches 400A and 400B, may be also included in cards 200A and 200B, respectively. The switches can be set in various to configurations to promote the desired functionality within system 100. Certain embodiments of system 100 may also include reset circuitry (not shown) on cards 200A and 200B, respectively. The reset circuitry is used to generate reset signals to inform the system of certain conditions (e.g., power interruption, control card or peripheral detachment from the system) so that data loss and/or data corruption can be detected and prevented. The reset circuitry can be independently implemented or integrated in other system components such as controllers 218A and 218B, in accordance with one or more aspects of the invention. Similarly, other components on cards 200A and 200B have been discussed as separate and discrete components. These components, however, may be combined to form larger or different integrated circuits or electrical assemblies, if desired.

Program Logic for Bus Resets

Figure 2:
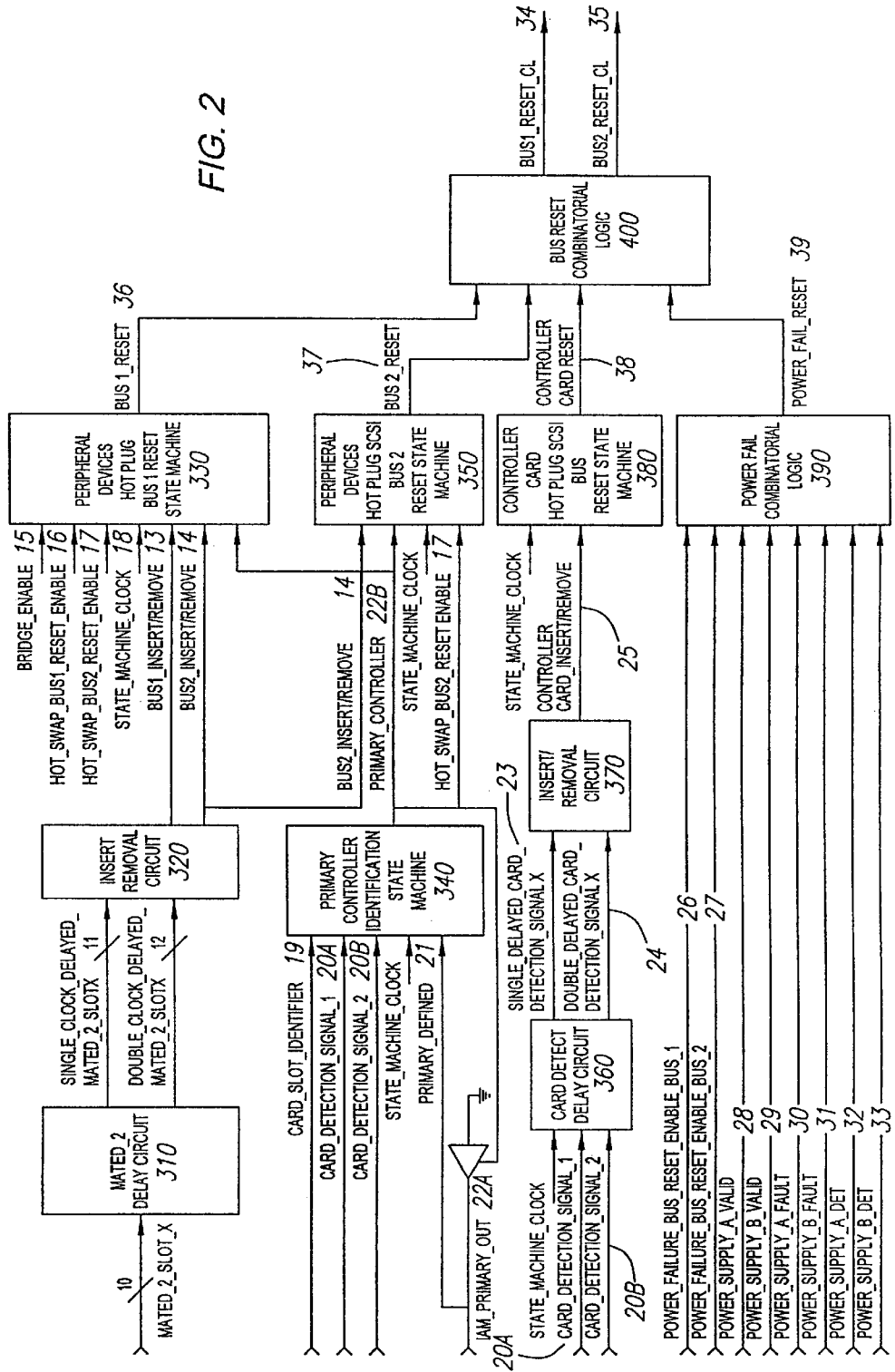
FIG. 2 is a high level flow diagram of the logic circuitry included in the system of FIG. 1 for generating reset signals to reset the even and odd communication buses, in accordance with one or more embodiments of the invention.

Referring to FIG. 2, controllers 218A and 218B (FIG. 1) include logic chips that include logic circuitry for generating reset signals to reset buses 108 and 110 based on the status of controller cards 200A and 200B and occurrence of certain events or actions. As provided in further detail below, these actions or events can include: interrupting power to the system; attaching to or removing one or more peripheral devices to or from the system; attaching to or removing one or more controller cards to or from the system; and powering up the system.

As stated earlier, one of the controller cards 200A or 200B assumes primary status and acts as the central control logic unit that manages system 100. Having none or more than one control logic unit is not conducive to efficient management of a communication bus system. Implementing a system with more than one control logic unit requires maintenance of sophisticated arbitration algorithms and other overhead that are expensive to design and maintain. Embodiments of the invention, however, may be implemented to include such arbitration algorithms and more than two controller cards. In certain embodiments, at least one controller card assumes primary status as further described herein. The card with the primary status is also referred to as the master card. All other cards with non-primary status are referred to as non-primary or slave cards.

Referring to FIGS. 1, for example, where two controller cards 200A and 200B are included in system 100, the system is implemented to give preferred status to slot 114 as the card that would assume primary status. Thus, if both cards 200A and 200B are plugged into the system with card 200A in slot 112 and card 200B in slot 114, when the system is powered, then controller card 200B assumes primary status, and controller card 200A assumes non-primary status.

Alternatively, controller card 200A may be the primary card and controller card 200B may be the non-primary card, if the system is implemented such that slot 112 is given preferred status. The primary card, is responsible for configuring buses 108, 110, as well as providing other services such as bus addressing and internal card termination. The non-primary card is responsible for services such as bus addressing and internal card termination, as well.

In some embodiments, the non-primary card is not responsible for configuring buses 108, 110, and responds to bus operation commands from the primary card, instead of initiating those commands itself. The primary and non-primary cards are physically and electrically the same, with "primary" and "non-primary" denoting functions of the bus controller cards rather than unique physical configurations. Due to compatibility considerations, backplane 260 may be adapted to receive in bus controller slots 112 and 114 various controller card models. Different models utilize different voltage differential interfaces to buses 108 and 110, for example.

In some embodiments, backplane 260 may be included in a Hewlett-Packard HVD10 disk enclosure and may be adapted to receive either HVD10 or SC10 bus controller cards, for example. The HVD10 card utilizes a high voltage differential (HVD) interface to the buses 108 and 110. The SC10 utilizes a low voltage differential (LVD) interface to the buses 108 and 110.

In one or more embodiments, controller cards HVD10 and SC10 may be considered incompatible, in that the system may not be able to support two different types of cards at the same time. Thus, in circumstances when the controller cards plugged into the system are incompatible, the newly plugged in card will disengage from the system, so as not to corrupt the data flow within the system.

Logic chips (e.g., FPGAs or ASICs) in controllers 218A and 218B, may include isolator/expanders 208A, 208B, 209A, and 209B or bridges 216A and 216B capable of electrically isolating or bridging buses 108 and 110 as described earlier. Controllers 218A and 218B may also include programmable logic reset circuitry for generating bus reset signals. FIG. 2 is a high level logic flow diagram of this reset circuitry. Table 1 below provides signal definitions for each of the signals illustrated in FIG. 2.

TABLE 1

| Signal | Signal Description |
|---|---|
| Mated_2_Slot X 10 | A series of Mated_2 signals (a signal for each peripheral device) that come directly from the peripheral devices and indicate the attachment of a peripheral or a communication port on a bus. |
| Single_Clock_ Delayed_Mated_2 _Slot_X 11 | Mated_2 signals delayed by 1 clock cycle |
| Double_Clock_ Delayed_Mated_2 _Slot X 12 | Mated_2 signals delayed by 2 clock cycles |
| Bus1_ Insert/Remove 13 | A signal that indicates a peripheral device has been inserted or removed from Bus 108. |
| Bus2_ Insert/Remove 14 | A signal that indicates a peripheral device has been inserted or removed from Bus 110 |
| Bridge_Enable 15 | This signal indicates the bridging of the buses 108 and 110 together via a bridge chip. When active this signal indicates the buses are bridged. |
| Hot_Swap_Bus1_ Reset_Enable 16 | When active this signal allows bus resets on Bus 108 when a peripheral device is inserted or removed from Bus 108 |
| Hot_Swap_Bus2_ Reset_Enable 17 | When active it allows bus resets on Bus 108 when a disk drive is inserted or removed from Bus 110 |
| State_Machine_ Clock 18 | This signal clocks the state machines |
| Card_Slot_ Identifier 19 | This signal indicates which interface slot the card is in. |
| Card_Detection Signal_20A, 20B | These signals indicate the presence of a card in the other slot. The pair of detection signals allows different card types to be identified. |
| Primary_Defined 21 | When low, this signal indicates a primary card has been defined |
| IAM_Primary_ out 22A Primary_Controller 22B | These signals are driven low by the Primary Controller Identification State Machine when it determines it is primary |
| Single_Delayed_ Card_Detection_ Signal_X 23 | These are Card Detection signals delayed by 1 clock cycle |
| Double_Delayed_ Card_Detection _Signal_X 24 | These are Card Detection signals delayed by 2 clock cycles |
| Controller_Card_ Insert/Remove 25 | This signal indicates a controller card has been inserted or removed from the enclosure |
| Power_Failure_ _Bus _Reset_Enable _Bus_1 26 | When active it allows bus resets on Bus 108 when There is a power failure |
| Power_Failure_ _Bus_Reset_Enable _Bus_2 27 | When active it allows bus resets on Bus 110 when There is a power failure |
| Power_Supply_ A_Valid 28 | Indicates that the voltage out of the power supply A is within tolerance |
| Power_Supply_ B_Valid 29 | Indicates that the voltage out of the power supply B is within tolerance |
| Power_Supply_ A_Fault 30 | Signal issued by power supply A when there is a failure such as over-temperature, over voltage or over current |
| Power_Supply_ B_Fault 31 | Signal issued by power supply B when there is a failure such as over-temperature, over voltage or over current |
| Power_Supply_ A_Det 32 | The signal indicates when power supply A is present |
| Power_Supply_ B_Det 33 | The signal indicates when power supply B is present |
| Bus1_Reset_CL 34 | This signal resets Bus 108 |
| Bus2_Reset_CL 35 | This signal resets Bus 110 |
| Bus1_Reset 36 | An intermediate signal indicating Bus 108 should be reset due to an insertion or removal of a disk |
| Bus2_Reset 37 | An intermediate signal indicating Bus 110 should be reset due to an insertion or removal of a disk |
| Controller_Card_ Reset 38 | An intermediate signal indicating both Buses should be reset due to an insertion or removal of a Controller Card |
| Power_Fail_ Reset 39 | An intermediate signal indicating both Buses should be reset due to a power supply failure |

The programmable logic for the reset circuitry is used by controller cards 200A and 200B to generate bus resets. In order to avoid data corruption, even bus 108 and odd bus 110 are reset by the reset circuitry in three instances, provided that the pertinent circuitry is enabled. In the first instance, one of the control cards 200A or 200B is inserted or removed from an interface slot 112 or 114. In this case, according to one or more embodiments, both even bus 108 and odd bus 110 are reset.

In the second instance, one or more peripheral devices, such as disk drives, are inserted or removed from buses 108 or 110. In this case, if the peripheral device is removed from even bus 108, for example, and even bus 108 is controlled by controller card 200A, then bus 108 is reset if control card 200A is the primary controller card and also if even bus 108 is isolated from odd bus 110. Under the same conditions, however, if even bus 108 and odd bus 110 are bridged, then both buses 108 and 110 are reset. In the third instance, even bus 108 and odd bus 110 are both reset when all power sources connected to system 100 fail.

In one or more embodiments, the reset circuitry that controls the resets in the system takes into account that at least two controller cards are included in the system. Also, the reset circuitry takes into account the configuration of controller cards 200A and 200B as to whether each controller card is in a bridged or split bus Mode. The reset circuitry further allows control to be passed from one controller card to the other, when one of the control cards is inserted or removed from the system.

Referring to FIG. 2, the reset circuitry includes Mated_2 Delay Circuit 310, Insert Removal Circuit 320, Peripheral Device Hot Plug Bus 1 Reset State Machine 330, Primary Controller Identification State Machine 340, Peripheral Devices Hot Plug Bus 2 Reset State Machine 350, Card Detect Delay Circuit 360, Insert Removal Circuit 370, Controller Card Hot Plug Bus Reset State Machine 380, Power Fail Combinatorial Logic 390, and Bus Reset Combinatorial Logic 400.

Referring to FIGS. 1 and 2, Mated_2 Delay Circuit 310 receives signal 10 and produces signals 11 and 12. Signals 10, 11, and 12, in one or more embodiments of the system, are 10 Bit Mated_2 signals. Signal 10 represents a series of Mated_2 Signals that are produced by the peripheral devices attached to the system to indicate, among other things, the presence of a peripheral device on a bus in system 100. Signal 11 is signal 10 delayed by one clock cycle, for example. Signal 12 is signal 10 delayed by two clock cycles, for example. Other delay values may be used in other system embodiments, if desired, depending on implementation.

Insert Removal Circuit 320 receives signals 11 and 12 and produces signals 13 and 14. Signal 13 indicates whether or not a peripheral device has been inserted or removed from bus 108, for example. Signal 14 indicates whether or not a peripheral device has been inserted or removed from Bus 110, for example. Peripheral Devices Hot Plug Bus 1 Reset State Machine 330 receives signals 13 and 14 in addition to signals 15, 16, 17, and 18. Peripheral Devices Hot Plug Bus 1 Reset State Machine 330 determines whether even bus 108, for example, should be reset due to an insertion or removal of a peripheral device. Accordingly, Peripheral Devices Hot Plug Bus 1 Reset State Machine 330 produces signal 36, which indicates that bus 108 should be reset due to an insertion or removal of a peripheral device to bus 108.

Primary Controller Identification State Machine 340 receives signals 19, 20A, 20B, and 21; and is synchronized by State Machine Clock, as shown in FIG. 2. Primary Controller Identification State Machine 340 further produces signal 22B. Signal 19 identifies the interface slot in which a controller card is inserted. Signals 20A and 20B are used to indicate to a controller card in an interface slot whether or not other interface slots in the system include a controller card. Detection signals 20A and 20B allow different control card types to be identified.

For example, if both signals 20A and 20B are driven low, that's an indication that controller cards included in interface slots 112 and 114, for example, are compatible. If the signals are both driven high, then that's an indication, for example, that there are no cards inserted in the other slot. If, for example, signal 20A is driven high and signal 20B is driven low, that is an indication that the other slot includes a controller card. The control cards included in slot 112 and 114, however, may not be compatible if signals 20A and 20B do not match.

Signal 21 is used to identify that a primary card has been defined. In embodiments of the invention, signal 21 is driven low, for example, when a primary card has been identified. If controller cards inserted in slot 112 and 114 are compatible, then signal 22B is used to activate a tristate buffer that generates signal 22A as shown in FIG. 2. Signal 22A drives signal 21. In accordance with one embodiment of the system, when signal 22A is driven low, it is an indication that the controller card receiving signals 20A and 20B has attained primary status.

Peripheral Devices Hot Plug 2 Reset State Machine 350 receives signals 14, 22B, and 17; and is synchronized by State_Machine_Clock signal, as shown. Peripheral Devices Hot Plug 2 Reset State Machine 350 also generates signal 37. As stated earlier, signal 14 is generated by Insert Removal Circuit 320 and indicates that a peripheral device has been inserted or removed from bus 110, for example. Signal 17, if activated allows for bus resets on bus 110 when a peripheral device is inserted to or removed from bus 110, for example. Signal 37 is a signal indicating that bus 110 should be reset due to an insertion or removal of a peripheral device.

Card Detect Delay Circuit 360 receives signals 20A and 20B and is synchronized by a signal from State_Machine_Clock. Card Detect Delay Circuit 360 generates signals 23 and 24. Signal 23 is a card selection signal delayed by one clock cycle and signal 24 is a card detection signal delayed by two clock cycles, for example, in accordance with one aspect of the invention. Insert Removal Circuit 370 receives signals 23 and 24 and generates signal 25. Signal 25 indicates that a controller card has been inserted or removed from the system.

Controller Card Hot Plug Bus Reset State Machine 380 receives signal 25 and produces signal 38. Signal 38 is an intermediate signal indicating that both buses 108 and 110 should be reset due to an insertion or removal of a controller card. Power Fail Combinatorial Logic 390 receives signals 26 through 33, as shown in FIG. 2, and produces Signal 39. Signal 26 when activated resets bus 108 when there is a power failure. Signal 27 when activated resets bus 10 when there is a power failure. Signal 28, in accordance with one embodiment, indicates that the voltage out of first power supply is within tolerance. The voltage is within tolerance in the system if it can support electrical needs of the components of the system. The voltage is not within tolerance if it is so low as to cause data corruption or an interruption in power within the system.

In embodiments of the system that include more than one power supply signal 29 indicates, for example, that the voltage out of the second power supply is within tolerance. Signal 30 is issued by the first power supply when there is failure such as over temperature, over voltage, or other electrical problem in the system. Signal 31 is issued likewise, by a second power supply, for example, when there is a failure in the system. Signals 32 and 33, respectively, indicate when the first and second power supplies are present in the system. The presence of power supply in the system indicates that the power supply provides sufficient electrical current to the system for its components to operate efficiently and successfully.

Bus Reset Combinatorial Logic 400 receives signals 36, 37, 38, and 39 and produces signal 34 and 35. Signal 34 resets bus 108 and signal 35 resets Bus 110, in accordance with one or more embodiments of the system.

Insertion or Removal of Controller Cards

Figure 3:
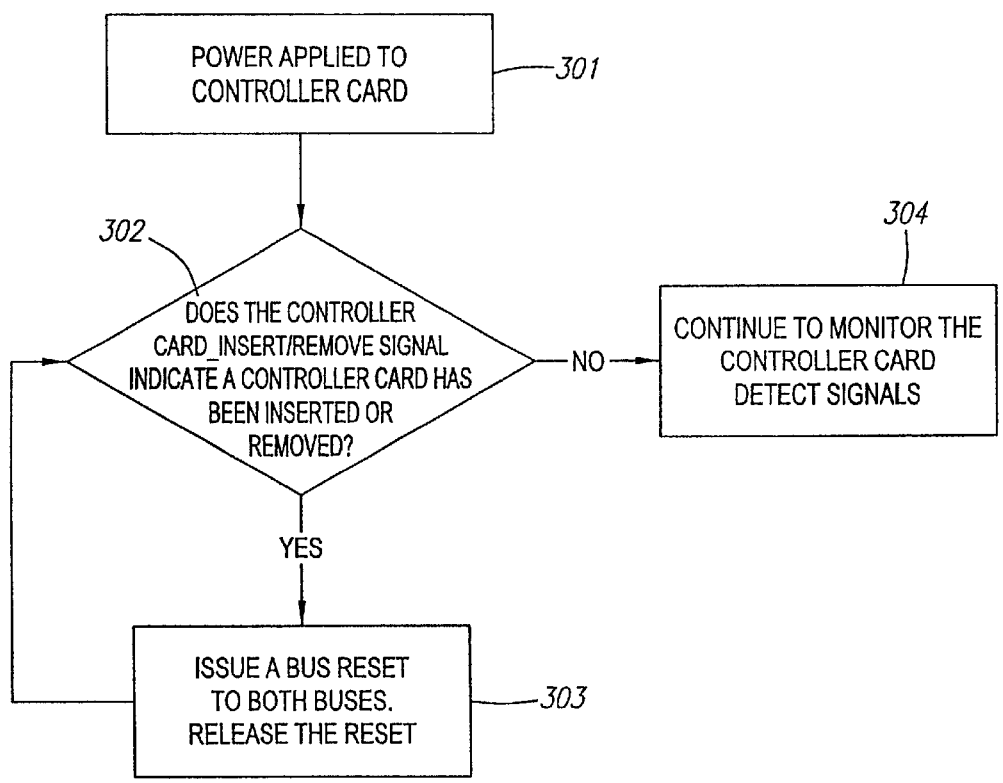
FIG. 3 is a flow diagram illustrating a method of issuing bus resets when a controller card has been added or removed from the system of FIG. 1, in accordance with one or more embodiments of the invention.

Referring to FIG. 1, in accordance with one aspect of the system, the reset circuitry issues reset signals to buses 108 and 110, when a controller card 200A or 200B is inserted to or removed from slots 112 or 114. Referring to FIG. 3, at step 301, when controller card 200A is inserted into interface slot 112, for example, power is applied to controller card 200A.

Referring to FIG. 2, when controller card 200A is inserted in slot 112, then signals 20A and 20B are driven low (or high depending on implementation). When controller card 200A is removed from slot 112, then signals 20A and 20B are driven high (or low in an alternate implementation) by backplane 260. Signals 20A and 20B are processed by Card Detect Delay Circuit 360 to produce delayed signals 23 and 24. Delayed signals 23 and 24 are in turn processed by Insert Removal Circuit 370 to produce Controller_Card_Insert/Remove signal 25. Signal 25 indicates whether a controller card has been inserted or removed from an interface slot. Thus, as shown in FIG. 3 at step 302, it is determined if signal 25 indicates that controller card 200A has been inserted or removed from slot 112, for example.

Signal 25 is received by Controller Card Hot Plug Bus Reset State Machine 380 and processed. At step 303, if signal 25 indicates an insertion or removal, then Controller Card Hot Plug Bus Reset State Machine 380 issues a Controller_Card_Reset signal 38 to reset buses 108 and 110, in case any data being communicated on the buses is corrupted or lost. In one or more embodiments, a reset timer is included in Controller Card Hot Plug Bus Reset State Machine 380 that holds reset signal 38 for 25 Micro Seconds, for example, before the reset signal 38 is released. The length of delay may vary in different embodiments, if desired.

At step 304, if signal 25 does not indicate an insertion or removal, then Insert Removal Circuit 370 continues to monitor card detection signals 23 and 24 for an indication that a controller card has been added or removed from the system. Bus Reset Combinatorial Logic 400 includes control logic to process signals 36, 37, 38, and 39 to determine whether both or only one of the buses should be reset. If both buses are to be reset then both signals 34 and 35 are activated; otherwise only the corresponding signal is activated. Accordingly, in one or more embodiments, if a controller card is inserted to or removed from an interface slot then buses 108 and 10 are reset.

Table 2 below provides bus reset information for conditions under which a controller card is inserted to or removed from the system. As shown, these conditions are not dependent on whether the buses are bridged or not.

TABLE 2

| Action | Controller Card Status | Result |
|---|---|---|
| A controller card is inserted into an operating system that already has one controller card | Primary | Issues a reset on buses 108 and 110 |
| | Non-primary | The newly inserted card assumes secondary status |
| An active system with two controller cards has the primary controller card removed. | Primary | Is removed from the enclosure |
| | Non-primary | Issues a bus reset on buses 108 and 110 and then assumes primary status |
| An active system with two controller cards has the non-primary controller removed | Primary | Issues a SCSI Bus reset on Bus 108 and 110 |
| | Non-primary | Is removed form the enclosure |

Insertion or Removal of Peripheral Devices

In accordance with one aspect of the invention, when a peripheral device is added or removed from a communication bus in the system, one or both of the communication buses may need to be reset, depending on the status of the primary controller card, and whether or not the communication buses in the system are bridged or split at the time.

Each peripheral device attached to the system generates one or more signals, such as signal 10, that are received by Mated_2 Delayed Circuit 310. Signal 10 is processed by delay circuit 310 to generate clocked delay signals 11 and 12, which are in turn processed by Insert Removal Circuit 320. Based on the signals received from the peripheral devices Insert Removal Circuit 320 generates signals 13, 14, 16, and 17 that indicate the insertion or removal of a peripheral device on a specific bus and allow for the corresponding buses to be reset. A Bridge_Enable signal 15 indicates whether buses 108 and 110 are bridged at the time of insertion or removal.

Figure 4:
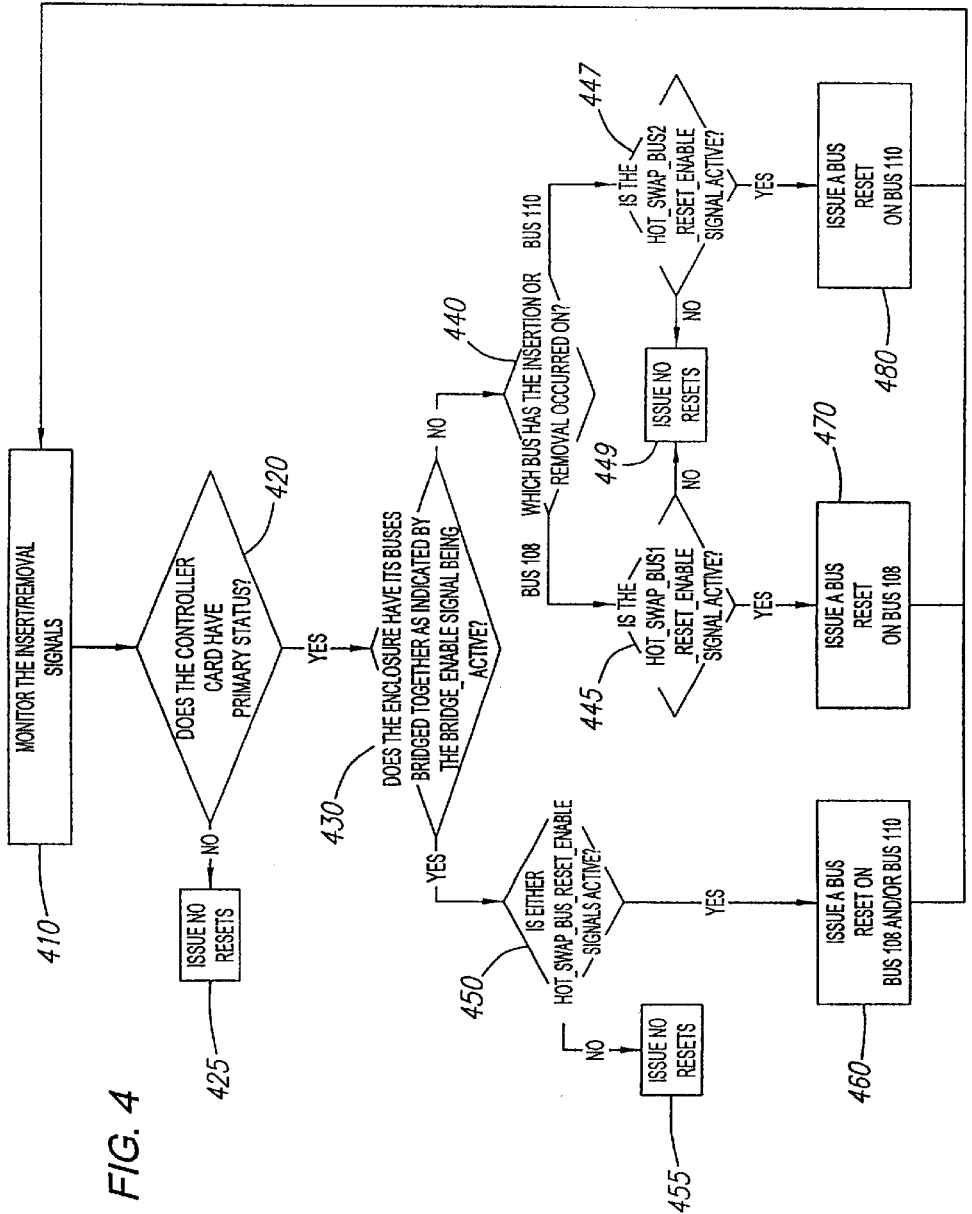
FIG. 4 is a flow diagram illustrating a method of issuing bus resets when a peripheral device has been added or removed from the system of FIG. 1, in accordance with one or more embodiments of the invention.

Referring to FIG. 4, by processing signals 11 through 17, Insert Removal Circuit 320 and Peripheral Devices Hot Plug Bus 1 Reset State Machine 330, at step 410, monitor the insertion or removal of a peripheral device from the system. When a peripheral device is inserted or removed from the system, then at step 420 Primary Controller Identification State Machine 340 processes signals 19, 20A, 20B, and 21 to determine if the controller card that controls the bus to which the peripheral device has been attached has primary status. Signal 21 when low indicates that a primary card has been defined, and card slot identifier 19 indicates the interface slot in which the primary card is plugged into.

If Primary Controller Identification State Machine 340 detects that the controller card to which the peripheral device is attached does not have primary status, then at step 425, Peripheral Devices Hot Plug Bus 2 Reset State Machine 350 issues no resets. This is because the primary and the non-primary controller cards may have been configured differently. One may be in bridged bus mode and the other in split bus mode. If so allowing the non-primary controller card to issue resets as well as the primary controller card could result in conflicting bus resets. If Primary Controller Identification State Machine 340 detects that the controller card to which the peripheral device is attached does have primary status, then at step 430, signal 15 is processed to determine if buses 108 and 110 are bridged or split.

If buses 108 and 110 are bridged then, at step 450, it is determined if signals 16 and 17 are active. When signals 16 and 17 are active, buses 108 and 110 may be reset if a peripheral device is attached to or removed from the buses. Thus, referring to FIG. 4, if signals 16 and 17 are inactive, then at step 455, Peripheral Devices Hot Plug Bus 1 Reset State Machine 330, and Peripheral Devices Hot Plug Bus 2 Reset State Machine 350 issue no reset signals. Otherwise, if signal 16 is active, then Peripheral Devices Hot Plug Bus 1 Reset State Machine 330 produces bus reset signal 36 to reset bus 108. If signal 17 is active, then Peripheral Devices Hot Plug Bus 2 Reset State Machine 350 produces bus reset signal 37 to reset bus 110.

If buses 108 and 110 are isolated then, at step 440, it is determined which bus was connected to the ports where the insertion or removal of the peripheral device took place. Referring to FIG. 4, if the peripheral device was attached or removed from bus 108 then at step 445, Peripheral Devices Hot Plug Bus 1 Reset State Machine 330 determines if signal 16 is active. If so then bus reset signal 36 is generated, at step 470, to reset bus 108. Else, at step 449, no reset signals are issued by Peripheral Devices Hot Plug Bus 1 Reset State Machine 330.

Similarly, if the peripheral device was attached or removed from bus 110 then at step 447, Peripheral Devices Hot Plug Bus 2 Reset State Machine 350 determines if signal 17 is active. If so then bus reset signal 37 is generated, at step 480, to reset bus 110. Else, at step 449, no reset signals are issued by Peripheral Devices Hot Plug Bus 2 Reset State Machine 350.

Thus, for example, if a peripheral device is inserted to or removed from bus 108 then if controller card 200A inserted in interface slot 112 has primary status then if buses 108 and 110 are bridged then buses 108 and 110 are both reset; if buses 108 and 110 are isolated then bus 108 is reset. Further, if a peripheral device is inserted to or removed from bus 110, then if controller card 200B inserted in interface slot 114 has primary status then if buses 108 and 110 are bridged then buses 108 and 110 are reset. However, if buses 108 and 110 are isolated then bus 110 is reset.

The following tables 3 and 4 present reset information depending on whether buses 108 and 110 are bridged or isolated.

TABLE 3

| Action (In split Bus Mode) | CONTROLLER CARD STATUS | Result |
|---|---|---|
| A peripheral device is inserted or removed from bus 108 when resets on bus 108 are enabled | Primary | Issues a bus reset on bus 108 |
| | Non-primary | Issues no reset |
| A peripheral device is inserted or removed from bus 110 when resets on bus 110 are enabled | Primary | Issues a bus reset on bus 110 |
| | Non-primary | Issues no reset |

TABLE 4

| Action (In Bridged Mode) | CONTROLLER CARD STATUS | Result |
|---|---|---|
| A peripheral device is inserted or removed from Bus 108 when resets on bus 108 or bus 110 are enabled | Primary | Issues a bus reset on bus 108 and/or on bus 110 |
| | Non-primary | Issues no reset |
| A peripheral device is inserted or removed from Bus 110 when resets on bus 108 or bus 110 are enabled | Primary | Issues a bus reset on bus 108 and/or Bus 110 |
| | Non-primary | Issues no reset |

Power Interruption

Figure 5:
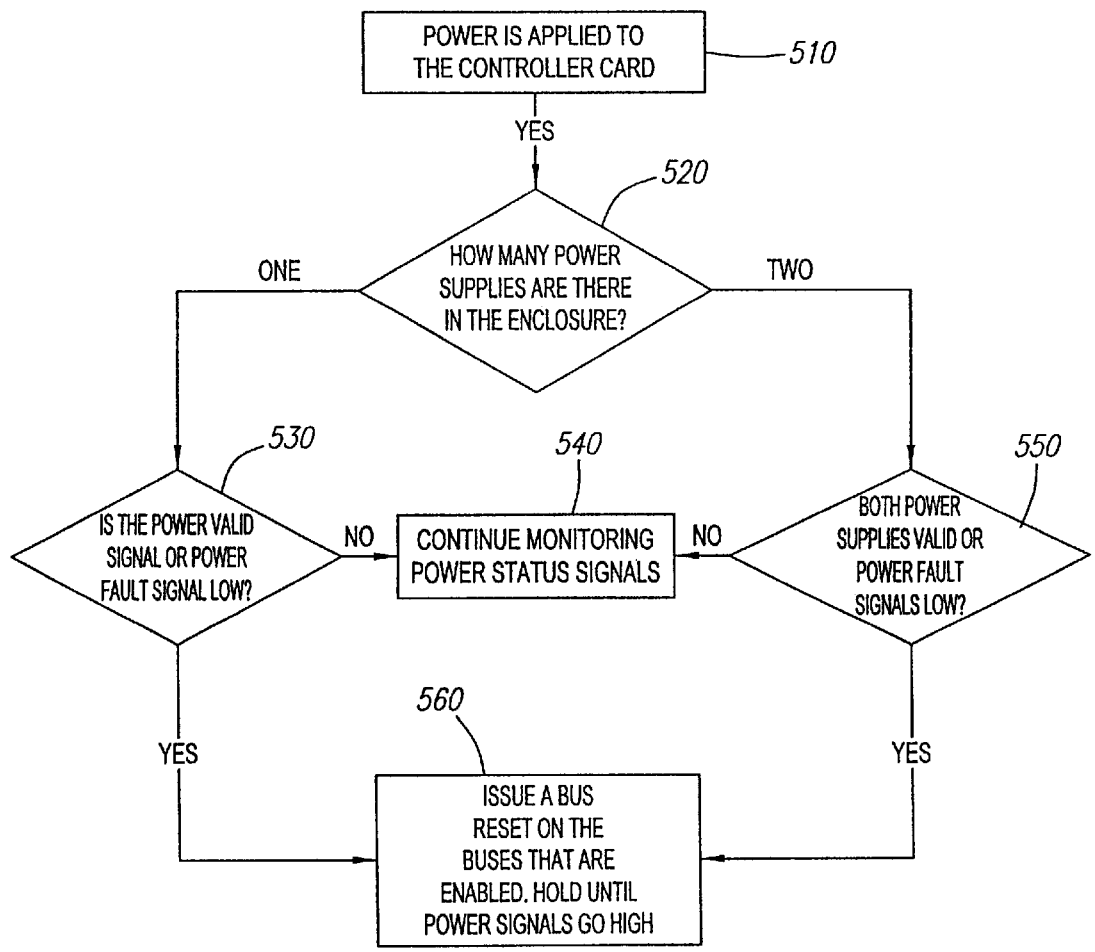
FIG. 5 is a flow diagram illustrating a method of issuing bus resets when power supply to the system of FIG. 1 is interrupted, in accordance with one or more embodiments of the invention.
Figure 6:
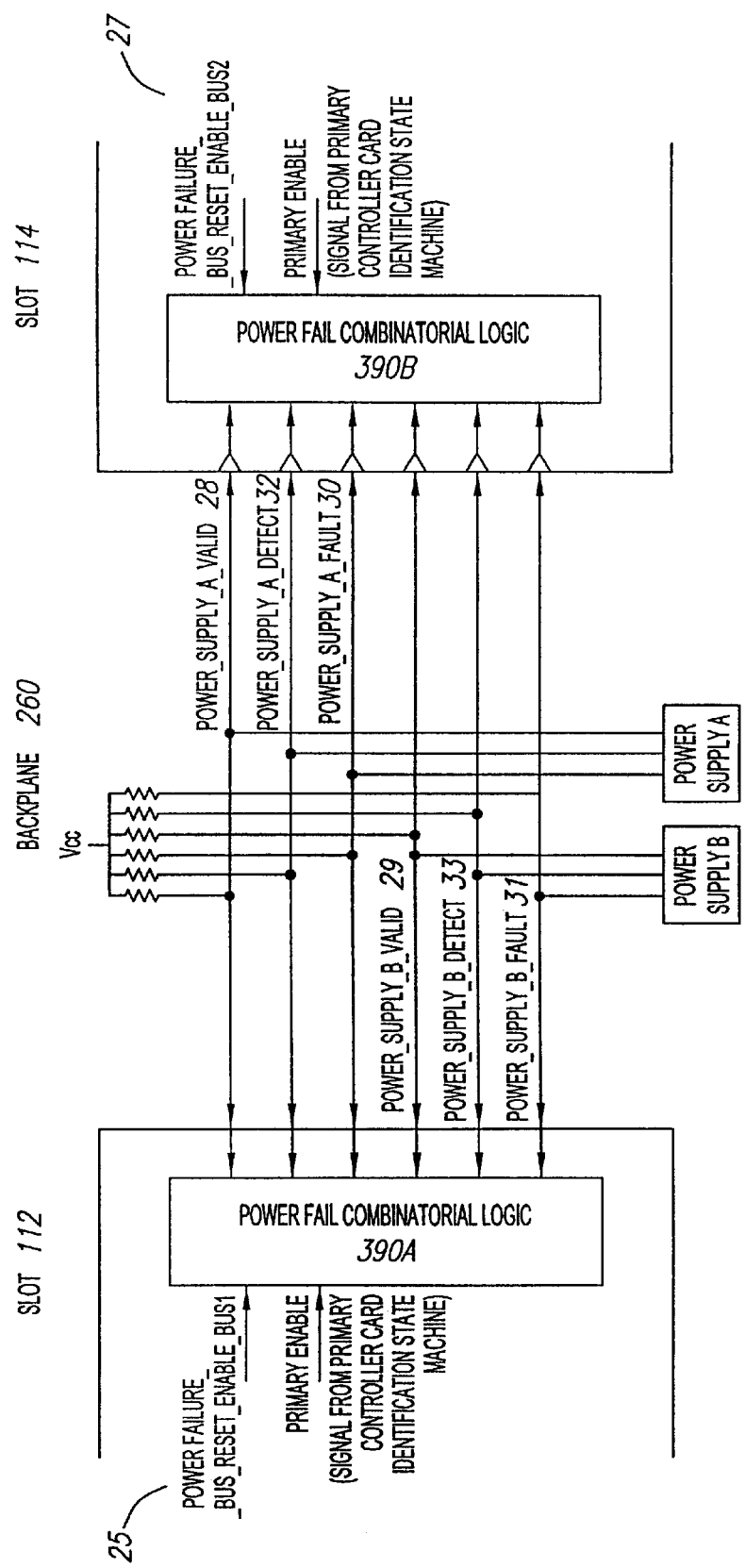
FIG. 6 is a schematic of the power supply system of FIG. 1 illustrating the flow of power supply signals in the system, in accordance with one or more embodiments of the invention.

Referring to FIG. 5 and 6, system 100, in accordance with one aspect of the invention may be powered by one or more power sources, for example power supply A and power supply B. As shown in FIG. 6, power supplies A and B are electrically connected to Power Fail Combinatorial Logics 390A and 390B, collectively illustrated as Power Fail Combinatorial Logic 390 in FIG. 2. Power Fail Combinatorial Logic 390 receives signals 26 through 33 and processes those signals to generate a power fail reset signal 39 if there is an indication that all power supplies may fail.

Signals 28 and 29, respectively, indicate whether the voltage produced by power supply A and B are within tolerance levels as described above. Signals 30 and 31, respectively, indicate whether power supplies A or B have failed or may fail due to over heating, or excessive voltage or current applied or generated by the power supplies. Signals 32 and 33, respectively, indicate whether power supplies A and B are connected to the system.

Referring to FIG. 5 at step 510, when a controller card is plugged into an interface slot or when the system is powered on, power is applied to the controller card. At step 520, Power Fail Combinatorial Logics 390A and 390B process signals 32 and 33 to determine the number of power supplies connected to the system. If one power supply, for example, power supply A is present only, then at step 530 signals 28 and 30 are examined to determine if power supplied to the system by power supply A meets the minimum requirements and/or to determine if there are any power faults that may be attributed to power supply A. If so, then at step 560, a bus reset is generated on the buses that are connected to power supply A. Else, Power Fail Combinatorial Logics 390A continues to monitor the power status signals 28, 30, and 32, for power supply A.

At step 520, Power Fail Combinatorial Logics 390A and 390B after processing signals 32 and 33 determine the number and positions of the power supplies that are connected to the system. At step 550, signals 28 and 29 are examined to determine if power supplied to the system by power supplies A and/or B meets the minimum power supply requirements. Further, signals 30 and 31 are examined to determine if there are any power faults that may be attributed to all power supplies present. If so, then at step 560, a bus reset is generated on the buses that are connected to power supplies A and B to avoid any data corruption that may occur as the result of any power failure. Else, Power Fail Combinatorial Logics 390A and 390B continue to monitor the power status signals 28 through 33.

As such, in certain embodiments, if both power supplies fail then a power failure reset is issued on all buses in the system. In accordance with one aspect of the system, the power fail mechanism of this invention has been described as including two power supplies A and B. However, in other embodiments more or less than two power supplies may be utilized, if desired.

Table 5 below, provides the bus reset information for power fail conditions discussed above. Power fail conditions while dependent on the status of the controller card are not dependent on whether the buses are bridged or not.

TABLE 5

| Action | CONTROLLER CARD STATUS | Result |
| --- | --- | --- |
| All Power supplies in the enclosure fail | Primary | Issues a Bus Reset on busses enabled until power is removed from the controller card |

TABLE 5-continued

| Action | CONTROLLER CARD STATUS | Result |
| --- | --- | --- |
| | Non-primary | Issues a Bus Reset on the busses enabled until power is removed from the controller card |

Although the invention has been described with reference to particular embodiments, the description is only an example of the invention's application and should not be taken as a limitation. Consequently, various adaptations and combinations of features of the embodiments disclosed are within the scope of the invention as defined by the following claims and their legal equivalents.

What is claimed is:

1. A communications system comprising:
   first and second communication buses implemented on a backplane; and
   first and second controller cards for providing an independent channel of communication between one or more hosts and said first and second communication buses; each controller card comprising:
   a controller;
   a first backplane connector connected to said controller and adapted for connection to the first communication bus; and
   a second backplane connector connected to said controller and adapted for connection to the second communication bus,
   wherein one of the first or second controller cards is designated as the primary controller card to generate reset signals to reset the first and second communication buses such that:
   if a controller card is inserted to or removed from the system then the first communication bus and the second communication bus are reset.

2. The communication system of claim 1, wherein said first and second buses can be bridged to provide an additional channel of communication between said one or more hosts and said first and second buses.

3. The communication system of claim 2, wherein the primary controller card further generates reset signals to reset first and second buses such that:
   if a peripheral device is inserted to or removed from the first bus then if the first controller card has primary status then if the first and second buses are bridged then the first and the second buses are reset.

4. The communication system of claim 3, wherein the primary controller card further generates reset signals to reset first and second buses such that:
   if the first and second buses are isolated then the first bus is reset.

5. The communication system of claim 4, wherein the primary controller card further generates reset signals to reset first and second buses such that:
   if a peripheral device is inserted to or removed from the second bus then if the second controller card has primary status then if the first and second buses are bridged then the first and the second buses are reset.

6. The communication system of claim 5, wherein the primary controller card further generates reset signals to reset first and second buses such that:
   if the first and second buses are isolated then the second bus is reset.

7. The communication system of claim 6, further comprising one or more power sources, wherein the primary controller card further generates reset signals to reset first and second buses such that:

if power supply to the system is interrupted, then the first and second buses are reset.

8. In a communication system comprising first and a second communication buses, and first and second bus controller cards each providing for at least two independent channels of communication between one or more hosts and said first and second communication buses, one of said first or second controller cards being designated as the primary controller card for managing the first and second communication buses and resetting said first and second communication buses such that:

if a controller card is inserted to or removed from the system then the first and the second communication buses are reset.

9. The communication system of claim 8, wherein the first and second communication buses may be bridged to provide said one or more hosts with one or more additional independent channels of communication with the first and second communication buses.

10. The communication system of claim 9 wherein first and second buses are further reset such that:

if a peripheral device is inserted to or removed from the first bus then if the first controller card has primary status then if the first and second buses are bridged then the first and the second buses are reset.

11. The communication system of claim 10 wherein first and second buses are further reset such that:

if the first and second buses are isolated then the first bus is reset.

12. The communication system of claim 11 wherein first and second buses are further reset such that:

if a peripheral device is inserted to or removed from the second bus then if the second controller card has primary status then if the first and second buses are bridged then the first and the second buses are reset.

13. The communication system of claim 12 wherein first and second buses are further reset such that:

if the first and second buses are isolated then the second bus is reset.

14. The communication system of claim 13, further comprising one or more power sources.

15. The communication system of claim 14 wherein first and second buses are further reset such that:

if all power sources fail then first and second buses are reset.

16. The communication system of claim 15 wherein first and second buses are SCSI buses.

17. A communications system having a bus controller system, comprising:

first and second buses; and first and second controller cards connected to said first and second buses; each controller card comprising:

a controller;

first and second independent means of communication for one or more hosts to communicate with said first and second communication buses; and bridging means for providing a second independent means of communication between said one or more hosts and said first and second communication buses, wherein one of the first or second controller cards is designated as the primary controller card to generate reset signals to reset the first and second communication buses such that:

if a controller card is inserted to or removed from the system then the first communication bus and the second communication bus are reset;

if a peripheral device is inserted to or removed from the first bus then if the first controller card has primary status then if the first and second buses are bridged then the first and the second buses are reset;

if the first and second buses are isolated then the first bus is reset;

if a peripheral device is inserted to or removed from the second bus then if the second controller card has primary status then if the first and second buses are bridged then the first and the second buses are reset; and if the first and second buses are isolated then the second bus is reset.

18. The communication system of claim 17, further comprising:

a backplane, wherein said first and second communication buses are implemented on the backplane.

19. The communication system of claim 18, further comprising:

at least two power sources for supplying power to the system.

20. The communication system of claim 19, wherein the primary controller card further generates reset signals to reset first and second buses such that:

if both power sources fail, then the first and second buses are reset.

* * * * *